United States Patent Office 3,008,858
Patented Nov. 14, 1961

3,008,858
STABILIZATION OF DYES BY THE USE OF ULTRAVIOLET LIGHT-ABSORBING METAL CHELATES
Norman Blake, Rochester, N.Y., and Gustav Daendliker, Parkersburg, and William Hugh Holstein, Jr., Vienna, W. Va., assignors to E. I. du Pont de Nemours and Company, Wilmington, Del., a corporation of Delaware
No Drawing. Filed June 25, 1959, Ser. No. 822,728
6 Claims. (Cl. 154—2.77)

This invention relates to the stabilization of dyestuffs against photodegradation, and, more particularly, it relates to the use of metal chelates to stabilize dyes employed in the tinting of polyvinyl acetal resins.

This is a continuation-in-part application of our earlier application Serial Number 655,511, filed April 29, 1957, now abandoned.

Many objects are colored or tinted by soluble dyes, and the resultant colored object is subjected to the action of sunlight. Since it is well known that sunlight causes many dyed articles to fade, or to change in color, it is desirable that the dye contain a stabilizing compound which will inhibit the effect of the sunlight, but which will not impair the coloring properties of the dye. It has been found that certain metal chelates of nickel, cobalt, zinc, manganese, and chromium provide a remarkable stabilizing effect for the dyes used to tint polyvinyl butyral resin, such that there is no substantial change in color of the dye after exposure to sunlight over long periods of time. Although other compounds, such as commercial ultraviolet light absorbers, have been tried as dye stabilizers in this type of use, none has been found to provide the stabilizing protection offered by these metal chelates.

It is an object of this invention to provide a composition of a polyvinyl acetal colored with a compatible oil-soluble dye and stabilized against color degradation by the presence of certain metal chelates. It is another object of this invention to provide an automotive safety-glass interlayer tinted with a band of color which will not change to any undesirable extent even though the band is exposed to sunlight over long periods. Other objects will become apparent from the more detailed description of this invention which follows.

The above objects are accomplished by providing a polyvinyl acetal resin, normally in the form of a sheet, colored with a composition of improved light stability, that composition comprising at least 0.1 part by weight of a selected metal chelate dye stabilizer per part of undiluted oil-soluble dye. The metal chelate stabilizer is one in which the metal is selected from the group consisting of nickel, cobalt, zinc, manganese, and chromium when the ligand of the chelate is a dihydrocarbon dithiocarbamate, and the metal is selected from the group consisting of nickel and cobalt when the ligand of the chelate is selected from the group consisting of alkylxanthate, 8-hydroxyquinolate, 2-mercaptothiazole, o-aminobenzenethiol, salicylaldehyde ethylenediimine, and salicylaldehyde 1,2-propylenediimine. Salicylaldehyde ethylenediimine has been known by other names, e.g., alpha, alpha'-(ethylenedinitrilo)di-ortho-cresol and disalicylideneethylenediamine, and is the condensation product of 2 mols of salicylic aldehyde with 1 mol of ethylenediamine. Similarly, salicylaldehyde 1,2-propylenediimine is the condensation product of 2 mols of salicylaldehyde and 1 mol of 1,2-propylenediamine. In the preferred mode of operation a band of color is applied to a polyvinyl butyral resin sheet by means of rotogravure printing techniques, and the coloring matter which is applied is a mixture of an oil-soluble azo dye or anthraquinone dye and either nickel dialkyl dithiocarbamate or cobalt dialkyl dithiocarbamate as a dye stabilizer. The weight proportions of stabilizer to dye in this preferred mode of operation may be from 1:4 to 2:1. It has been found convenient to include these proportions of stabilizer:dye in a mixture containing 1–15% by weight of polyvinyl butyral resin, 1–15% by weight of a compatible ester plasticizer, 0.1–12% by weight of dye (calculated on the undiluted weight of the dye even though a diluent for the dye is also included in the composition), the appropriate amount of stabilizer according to the above preferred proportions, and the remainder being a solvent, such as dimethyl formamide. If the composition is to be used as a printing ink, it should have a viscosity of 10–15,000 centipoises, which viscosity may be governed by the molecular weight of the polyvinyl butyral resin mentioned above. After the sheet has been printed or sprayed with the above-described coloring matter, it may be desirable, although it is not necessary in certain embodiments of this invention, to season the dyed sheeting for a period of time so as to permit the dye and stabilizer to diffuse uniformly into the sheeting. Subsequently, the sheeting may be laminated between sheets of glass to produce a tinted safety-glass structure, if such an end-use is desired.

The following examples illustrate the features of this invention. In these examples, parts and percentages are based on weight unless otherwise noted. The test by means of which stability against photodegradation is measured is that by the American Association of Textile Chemists and Colorists (AATCC) Tentative Test Method 16A–54 and by the American Standards Association (ASA) Designation L14.53–1951. The above test specifications describe a carbon-arc lamp device in which samples may be exposed to the light rays of the arc for various times sufficient to cause the color of the sample to change. The device used in the following examples is a type FDA-R "Fade-Ometer." Color measurements of the amount of change in color are made on a recording spectrophotometer with automatic tristimulus integrator, and also on a differential colorimeter. The general procedures and definitions of color measurements as employed herein are described in ASTM D307–44 and D791–50. The amount of color change is reported as NBS (National Bureau of Standards) units of color differences. A color difference of 0.3 NBS units is about the minimum which can be detected visually by a skilled observer. The dyes which are employed in the examples include Du Pont Oil Blue A (E. I. du Pont de Nemours & Co.), Calcophen Yellow ZR (American Cyanamid Co.), Perox Yellow No. 9 (Patent Chemicals, Inc.), Calco Oil Yellow ZG Conc. (American Cyanamid Co.), and Interchem Acetate Violet R Base (Interchemical Corp.).

When multiple dye systems, e.g., the mixture of a yellow dye and blue dye to produce a green hue, are exposed to light, any of several effects may take place. Normally, one dye will be degraded faster than the other dye, and the degradation may result in the dye becoming lighter or darker, or even changing in color. The green dye, mentioned above, might become yellower, bluer, lighter green, darker green, redder, or some complex combination of these individual effects; and such a combination is the result usually experienced rather than a single uncomplicated effect. Furthermore, the rate of change and the direction of change are not uniform. A green dye may, upon exposure to light, slowly become yellower for a period of time and then rather suddenly become bluer. The addition of the dye stabilizers of this invention complicates the system still further since the stabilizer may impart a small amount of color in itself, and may stabilize one dye more effectively than another dye. The results reported herein represent the total color change in NBS units, without regard to the direction of the change, between the original unexposed sample and the same sample after a given number of hours of exposure.

EXAMPLE 1

Duplicate portions of a green ink were prepared having the following composition by weight:

| | Parts |
|---|---|
| Dimethyl formamide | 90.3 |
| Polyvinyl butyral | 4.87 |
| Di(beta-butoxyethyl)adipate | 0.95 |
| Du Pont Oil Blue A | 2.82 |
| Calcophen Yellow ZR | 1.04 |

To one of these duplicate portions there was added 1.0 part of nickel dibutyl dithiocarbamate (NBC) as a stabilizer for the dye. These inks were then used with an engraved roll to print a band of color onto a sheet of automotive safety-glass interlayer [polyvinyl butyral plasticized with di(beta-butoxyethyl)adipate], one piece of sheeting being printed with the ink containing the NBC, while the other was printed with the ink containing no NBC. After the ink was dry the sheeting was powdered with sodium bicarbonate, wound into a roll upon a core, and conditioned for three days at 60° C. to accelerate the diffusion of the ink into the sheeting. After the conditioning was completed, the sheeting was washed, dried, and laminated between two pieces of "E-Z Eye" plate glass. The laminates were then placed in the Fade-Ometer and the color changes noted after various hours of exposure. The results are shown in Table I.

*Table I*

| Laminate | Total luminous transmittance (illuminant C), Percent | Color differences in NBS units after the indicated hours of exposure | | | |
|---|---|---|---|---|---|
| | | 100 | 200 | 400 | 800 |
| Control sample | 22.98 | 9.7 | 16.6 | 25.7 | 39.2 |
| Sample with NBC | 20.93 | 1.7 | 5.3 | 13.8 | 23.8 |

EXAMPLES 2–5

Four dye systems were employed to test the stabilizing effect of nickel dibutyl dithiocarbamate (NBC). Each printing ink contained 56.4 parts of dimethyl formamide, 2.6 parts of polyvinyl butyral, and the amount of dye indicated below:

| | Parts |
|---|---|
| Example 2: | |
| Du Pont Oil Blue A | 1.5 |
| Example 3: | |
| Perox Yellow No. 9 | 1.5 |
| Example 4: | |
| DuPont Oil Blue A | 1.32 |
| Calco Oil Yellow ZG Conc | 0.48 |
| Example 5: | |
| Du Pont Oil Blue A | 0.48 |
| Interchem Acetate Violet R Base | 0.86 |
| Perox Yellow No. 9 | 0.45 |

Duplicate portions of each of the above four dye systems were used as printing inks. NBC was added to one of each of the duplicate printing inks so as to provide a control and a test sample for determining the stabilization effect of NBC. The amount of NBC used was 1.5 parts in Examples 2 and 3, and 1.8 parts in Examples 4 and 5. In order to compensate for the slightly yellow tinting effect due to NBC, the amount of Perox Yellow No. 9 employed in Example 5 in the portion containing NBC was reduced from 0.45 part to 0.43 part. Polyvinyl butyral sheeting was printed, conditioned, laminated, and tested as described in Example 1, and the results of the test are shown in Table II.

*Table II*

| Laminate | Total luminous transmittance (illuminant C), Percent | Color differences in NBS units after the indicated hours of exposure | | | |
|---|---|---|---|---|---|
| | | 100 | 200 | 400 | 800 |
| Example 2: | | | | | |
| Control | 21.94 | | 12.6 | 16.8 | |
| With NBC | 23.97 | | 6.2 | 9.2 | |
| Example 3: | | | | | |
| Control | 68.29 | | 7.9 | 12.4 | |
| With NBC | 67.58 | | 4.1 | 6.6 | |
| Example 4: | | | | | |
| Control | 27.02 | 2.6 | 4.0 | 10.5 | 21.4 |
| With NBC | 25.07 | 0.4 | 0.3 | 2.0 | 5.7 |
| Example 5: | | | | | |
| Control | 13.63 | 2.9 | 3.5 | 7.9 | 16.1 |
| With NBC | 13.69 | 1.3 | 0.9 | 2.4 | 6.7 |

EXAMPLE 6

A series of comparative tests was run in order to establish the optimum ratio of dye to stabilizer in a printing ink for the purposes of this invention. A green dye, comprising a mixture of a yellow azo dye and a blue anthraquinone dye, was used in a concentration of 2.9% by weight of the ink. The amount of NBC was varied in a series of tests, the results of which are shown in Table III.

*Table III*

| Laminate | Concentration of NBC in ink, percent | Ratio NBC/dye | Total luminous transmittance (illuminant C), percent | Color differences in NBS units after the indicated hours of exposure | | |
|---|---|---|---|---|---|---|
| | | | | 200 | 400 | 800 |
| A | 0 | | 32.19 | 2.4 | 3.7 | 6.0 |
| B | 0.75 | 0.26 | 36.19 | 1.3 | 2.1 | 3.3 |
| C | 1.50 | 0.52 | 32.94 | 1.2 | 1.7 | 2.8 |
| D | 2.25 | 0.78 | 34.37 | 1.0 | 1.7 | 2.4 |
| E | 3.00 | 1.04 | 33.20 | 0.9 | 1.6 | 2.3 |
| F | 4.50 | 1.55 | 33.38 | 0.8 | 1.4 | 1.9 |

EXAMPLE 7

In this series of tests a viscous solution of polyvinyl butyral was prepared, and, after the dye and the dye stabilizer were added, the resulting solution was cast into a film by being spread on a plate and allowed to solidify by evaporation of the solvent. The solution consisted of the following weight proportions.

| | Parts |
|---|---|
| 2B alcohol | 400 |
| Polyvinyl butyral resin | 72.5 |
| Di(beta-butoxyethyl)adipate | 29.0 |
| p-Octylphenol | 0.15 |
| Green dye | 0.08 |
| Stabilizer | 0.16 |

The green dye employed in these tests was a mixture of 2.76 parts of Du Pont Oil Blue A per 1 part of Calcophen Yellow ZR. The film was then stripped from the glass, laminated between two pieces of "E-Z Eye" plate glass, and subjected to a period of exposure in the "Fade-Ometer" as described above. The resulting change in color was measured after various hours of exposure and reported in Table IV in NBS units as described above. It may be seen from this tabulation that iron, lead, and cadmium chelates are ineffective as stabilizers, while nickel, cobalt, manganese, zinc, and chromium chelates are quite effective as stabilizers. These results are surprising when it might be expected that chelates of metals from the same family would react similarly.

Table IV

| Metal chelates as stabilizer candidates | Weight percent of Dye in Sheet | Weight percent of stabilizer in sheet | Total luminous transmittance (illuminant C), percent | Color differences in NBS units after the indicated hours of exposure in the fade-ometer | |
|---|---|---|---|---|---|
| | | | | Hours | NBS units |
| None—Control sample | 0.08 | -------- | 38.27 | 400 | 11.4 |
| Do | 0.08 | -------- | 38.27 | 800 | 20.3 |
| EFFECTIVE STABILIZERS | | | | | |
| Nickel dimethyldithiocarbamate | 0.08 | 0.16 | 34.38 | 800 | 13.8 |
| Nickel diethyldithiocarbamate | 0.08 | 0.16 | 34.73 | 800 | 5.0 |
| Nickel dibutyldithiocarbamate | 0.08 | 0.16 | 34.88 | 880 | 4.2 |
| Nickel di(2-ethylhexyl)dithiocarbamate | 0.08 | 0.16 | 37.60 | 800 | 2.7 |
| Nickel ethylxanthate | 0.08 | 0.16 | 27.26 | 800 | 11.4 |
| Nickel amylxanthate | 0.08 | 0.16 | 27.46 | 800 | 11.7 |
| Nickel salicylaldehyde ethylenediimine | 0.08 | 0.16 | 32.10 | 800 | 8.7 |
| Nickel 2-mercaptobenzothiazole | 0.08 | 0.16 | 33.34 | 800 | 9.4 |
| Cobalt dimethyldithiocarbamate | 0.08 | 0.16 | 32.35 | 800 | 6.7 |
| Cobalt dibutyldithiocarbamate | 0.08 | 0.16 | 35.48 | 800 | 9.6 |
| Cobalt salicylaldehyde ethylenediimine | 0.08 | 0.16 | 30.07 | 800 | 7.5 |
| Manganese dibutyldithiocarbamate | 0.08 | 0.16 | 33.39 | 800 | 13.2 |
| Zinc dibutyldithiocarbamate | 0.08 | 0.16 | 31.80 | 800 | 10.6 |
| Chromium dibutyldithiocarbamate | 0.08 | 0.16 | 36.59 | 800 | 13.4 |
| Cobalt salicylaldehyde 1,2-propylenediimine | 0.08 | 0.16 | 38.54 | 800 | 6.4 |
| Cobalt 8-hydroxyquinolate | 0.08 | 0.16 | 38.82 | 800 | 3.9 |
| Nickel 8-hydroxyquinolate | 0.08 | 0.16 | 40.58 | 800 | 13.3 |
| Cobalt O-aminobenzenethiol | 0.08 | 0.16 | 31.36 | 800 | 7.5 |
| Nickel O-aminobenzenethiol | 0.08 | 0.16 | 30.56 | 800 | 6.3 |
| INEFFECTIVE STABILIZERS | | | | | |
| Iron acetylacetone | 0.08 | 0.16 | 34.92 | 400 | 17.8 |
| Iron dimethyldithiocarbamate | 0.08 | 0.16 | 32.96 | 800 | 26.2 |
| Lead dimethyldithiocarbamate | 0.08 | 0.16 | 33.64 | 400 | 51.0 |
| Cadmium butylxanthate | 0.08 | 0.16 | 34.15 | 400 | 16.4 |
| 2,2'-dihydroxy-4-methoxy-benzophenone | 0.08 | 0.50 | 40.63 | 800 | 20.3 |

The dyes which may be employed in this invention include, in general, any oil-soluble dye which is compatible with a polyvinyl acetal. These dyes include, but are not limited to, the azo dyes, the anthraquinone dyes, and the substituted azo or anthraquinone dyes. It has been found that certain water-soluble dyes and certain spirit-soluble dyes are also provided with an improved light-fastness when used in combination with the stabilizers of this invention. However, because others of these dyes are not so stabilized the present invention is restricted to oil-soluble dyes.

The amount of metal chelate employed as a dye stabilizer in this invention is conveniently related to the amount of dye which is present. The weight ratio of stabilizer to dye should be at least 1:10 and normally not more than 5:1 since higher ratios fail to provide any significant increase in stability although such higher ratios are operable. The preferred ratio of stabilizer:dye is from 1:4 to 2:1. It should be noted that the amount of dye in these ratios relates to the amount of undiluted dye, and not to total weight of mixtures of dyes with liquid or solid diluents.

In certain embodiments of this invention it has been found desirable to incorporate an alkaline material, such as triethanolamine, into the described printing inks. The incorporation of this material enhanced the stabilization of certain anthraquinone dyes by nickel dibutyldithiocarbamate. In the absence of the amine the tinted plastic interlayer tended to produce a very slight yellowing, while in the presence of the amine there was no yellowing at all. Since this additive is advantageous in only a few of the compositions of this invention it is mentioned merely as an aid to obtaining the best results. A convenient concentration of triethanolamine or diethylcyclohexylamine has been found to be about 10–20% by weight of the total printing ink composition.

The composition containing the dye and stabilizer may be employed in many different methods of application, and the composition may contain certain ingredients for one method of use and other ingredients for other methods of use. For example, the dye and stabilizer may be part of a printing ink for use with rotogravure rolls, a sprayable composition for use with commercial paint sprayers, or a solution into which an article may be dipped. The essential components of the dye-containing composition are the dye, the dye stabilizer, and a carrier for the dye and its stabilizer. In its simplest terms, such as a composition might comprise a dye, a stabilizer, and a solvent for the dye and for the stabilizer. When the dye-containing composition must be somewhat viscous in order to be used properly, for example, as a printing ink or as a sprayable composition for certain purposes, the composition may include a polyvinyl acetal resin with or without an added plasticizer for the resin. When the composition of this invention is to be used as a printing ink or a spray for tinting polyvinyl butyral sheeting, a preferred composition contains 1–15% by weight of polyvinyl butyral, 1–15% by weight of a compatible ester plasticizer for the polyvinyl butyral, 0.1–8% by weight of a dye, 0.025–12% by weight of a dye stabilizer of this invention, and the remainder is a solvent for the other components. The viscosity of the printing ink composition should be 10–15,000 centipoises, and preferably 20–200 centipoises. Suitable solvents include dialkyl formamides, chlorinated hydrocarbons, alcohols, ketones, and mixtures of any of these with aromatic hydrocarbons or esters. Suitable plasticizers include triethylene glycol di(2-ethyl butyrate), di-(beta-butoxyethyl)adipate, dioctyl phthalate, and dibutyl sebacate. The polyvinyl butyral employed as a laminate in safety-glass is one analyzing 17–25% by weight vinyl alcohol, 0–2% by weight vinyl acetate, and 73–83% by weight vinyl butyral.

The composition of this invention is particularly useful as a component of automotive safety-glass where it is desirable to employ a tinted band of color which will not change color in any substantial amount because of exposure to sunlight. It is, of course, apparent that other uses may be made of a tinted polyvinyl acetal which is stabilized against undesirable color changes. For example, this stabilized composition may be used in colored glass windows for homes and office buildings, and in decorative laminated articles.

We claim:

1. A dyed composition having improved resistance to color changes induced by exposure to light, said composition comprising a polyvinyl acetal resin colored with an oil-soluble dye and containing per part of undiluted dye at least 0.1 part by weight of a dye stabilizer selected from the group of metal chelates in which the metal is from the group consisting of nickel, cobalt, zinc, manganese, and chromium, when the ligand of the chelate is a dihydrocarbon dithiocarbamate, and the metal is from the group consisting of nickel and cobalt when the ligand of the chelate is from the group consisting of alkylxanthate, 2-mercaptothiazole, 8-hydroxyquinolate, o-aminobenzenethiol, salicylaldehyde 1,2-propylenediimine, and salicylaldehyde ethylenediimine.

2. The composition of claim 1 in which said metal chelate is nickel dialkyl dithiocarbamate.

3. The composition of claim 1 in which said metal chelate is cobalt dialkyl dithiocarbamate.

4. In a safety-glass laminate an interlayer sheet of polyvinyl butyral containing coloring matter having an improved resistance to change induced by exposure to light, said coloring matter comprising 1 part by weight of undiluted dye per 0.1 to 5.0 parts by weight of a dye stabilizer selected from the group of metal chelates in which the metal is from the group consisting of nickel, cobalt, zinc, manganese, and chromium, when the ligand of the chelate is a dihydrocarbon dithiocarbamate, and the metal is from the group consisting of nickel and cobalt when the ligand of the chelate is from the group consisting of alkylxanthate, 2-mercaptothiazole, 8-hydroxyquinolate, o-aminobenzenethiol, salicylaldehyde 1,2-propylenediimine, and salicylaldehyde ethylenediimine.

5. In a safety-glass laminate an interlayer sheet of polyvinyl butyral containing a band of color comprising an oil-soluble dye and nickel dibutyl dithiocarbamate as a dye stabilizer in the weight ratio of 1:4 to 2:1 parts of dye per part of stabilizer.

6. In a safety-glass laminate an interlayer sheet of polyvinyl butyral containing a band of color comprising an oil-soluble dye and cobalt dibutyl dithiocarbamate as a dye stabilizer in the weight ratio of 1:4 to 2:1 parts of dye per part of stabilizer.

References Cited in the file of this patent

UNITED STATES PATENTS

| | | |
|---|---|---|
| 1,962,132 | Bradshaw | June 12, 1934 |
| 2,568,894 | Mackey | Sept. 25, 1951 |
| 2,636,420 | Ryan et al. | Apr. 28, 1953 |
| 2,736,729 | Krzikalla | Feb. 28, 1956 |

OTHER REFERENCES

Martell et al.: Chemistry of the Metal Chelates Compounds (Prentice-Hall, Inc.), pages 50–54.